US006894450B2

United States Patent
Cheng et al.

(10) Patent No.: US 6,894,450 B2
(45) Date of Patent: May 17, 2005

(54) CIRCUIT CONFIGURATION FOR PERMANENT MAGNET SYNCHRONOUS MOTOR CONTROL

(75) Inventors: Bing Cheng, West Bloomfield, MI (US); Duo Deng, Canton, MI (US); Fengtai Huang, Windsor (CA)

(73) Assignee: Ballard Power Systems Corporation, Dearborn, MI (US)

( * ) Notice: Subject to any disclaimer, the term of this patent is extended or adjusted under 35 U.S.C. 154(b) by 129 days.

(21) Appl. No.: 10/346,724

(22) Filed: Jan. 16, 2003

(65) Prior Publication Data

US 2003/0214266 A1 Nov. 20, 2003

Related U.S. Application Data

(60) Provisional application No. 60/319,068, filed on Jan. 16, 2002.

(51) Int. Cl.[7] .............................................. H02P 1/18
(52) U.S. Cl. ................. 318/254; 318/138; 318/439; 318/459; 318/500; 318/609; 318/610
(58) Field of Search ................. 318/138, 254, 318/439, 500, 609, 610

(56) References Cited

U.S. PATENT DOCUMENTS

| | | | | |
|---|---|---|---|---|
| 4,480,218 A | * | 10/1984 | Hair ............................ | 318/696 |
| 4,810,965 A | | 3/1989 | Fujiwara et al. ............ | 324/208 |
| 4,841,204 A | | 6/1989 | Studer ......................... | 318/254 |
| 5,739,664 A | * | 4/1998 | Deng et al. .................. | 318/808 |
| 5,742,110 A | | 4/1998 | Hefner ......................... | 310/154 |
| 5,751,112 A | | 5/1998 | Monma et al. ................ | 315/8 |
| 5,796,232 A | | 8/1998 | Alberter et al. ............. | 318/653 |
| 5,998,957 A | * | 12/1999 | Tadmor et al. ............. | 318/701 |
| 6,373,211 B1 | * | 4/2002 | Henry et al. ................ | 318/432 |

OTHER PUBLICATIONS

Micro Linear Corp., "ML4425/ML4426—Sensorless BLDC PWM Motor Controller," Technical Specifications, May 1997.

* cited by examiner

*Primary Examiner*—Rina Duda
(74) *Attorney, Agent, or Firm*—Seed IP Law Group PLLC

(57) ABSTRACT

Circuits and methods for use with an integrated circuit chip having internal back EMF estimation to control a permanent magnet synchronous motor includes an AC current feedback circuit, a scaling circuit, and a current regulator. Additionally, a speed regulator may be employed. In one embodiment, during operation at very low speed, the speed regulator is in an open loop control mode due to a back EMF detection limitation of the IC chip, and only the current regulator is active. A feedback current signal, together with a user-defined command current signal, serves the input of the current regulator, which controls the AC motor current and drives the motor speed from standstill. Once the motor speed reaches a certain level, the measured back EMF from the IC chip is sufficient to estimate the motor speed, which is compared with a user-defined command speed, and an error of the these two signals provides the input of a speed regulator.

53 Claims, 5 Drawing Sheets

CIRCUIT CONFIGURATION FOR PERMANENT MAGNET SYNCHRONOUS MOTOR CONTROL

This Application claims the benefit of provisional Application No. 60/319,068, filed Jan. 16, 2002.

BACKGROUND OF INVENTION

1. Field of the Invention

The present circuits and methods relate generally to the field of the control of electric machines, and more particularly to circuit configurations for and methods of controlling permanent magnet synchronous motors.

2. Background of the Invention

To have good dynamic response for a permanent magnet synchronous motor (PMSM), the controller should be able to control the torque component of the inverter output current to the motor based on the rotor position. The off-shelf hybrid integrated circuit (IC) chip ML4425 (from Micro Linear Corporation, San Jose, Calif.) provides an example of position sensorless control for brushless DC motors based on back electromotive force (back EMF) estimation. FIGS. 1A and 1B are adapted from an extract from the May 1997 ML4425 technical specification which illustrates a typical prior art application using an IC chip 10, such as the ML4425 chip. However, IC chips, such as the ML4425 chip, have limitations for wide speed range PMSM control systems. Such limitations include, for example, that alternating current (AC) motor current is not controllable, and the use of a single control loop structure in which only one of the two control modes—current control or speed control—can be selected.

A current limit control is incorporated in the IC chips, such as the ML4425 chip, and direct current (DC current) is used for the control. As is known, in inverter motor drive applications, the motor torque is proportional to its torque component of AC phase current, while motor power, which is shaft torque multiplied by shaft speed, is proportional to DC current with a constant DC bus voltage. Consequently, for a motor at low speed with high shaft torque, the DC current will be low, while the AC current is high due to low AC voltage. Thus, the DC current cannot be used to control motor torque in the entire speed range, and the DC current limit control used in IC chips such as the ML4425 chip cannot provide effective AC over current protection for AC permanent magnet motors and the devices of the inverter when the motor runs at low speed.

FIG. 2 is a block diagram which illustrates an example of a typical motor control system configuration utilizing an IC chip 10, such as the off-shelf ML4425 chip shown in FIGS. 1A and 1B. Referring to FIG. 2, the configuration includes inverter 12, which is an insulated gate bipolar transistor (IGBT) based component that converts DC voltage into AC with a variable frequency, and logic control and gate drive 14 which is a proprietary component built specifically for use with the particular IC chip 10. IC chip 10 is not intelligent but is simply an IC chip that controls a brushless DC motor. IC chip 10 provides gate drive control signals which control the IGBTs in inverter 12. It also includes a back EMF sampler or sensor 16, as shown in FIG. 1B, the input to which are voltage signals 152, 153, 154, as shown in FIG. 2. Basically, IC chip 10 of FIGS. 1A and 1B estimates the back EMF of a motor 18, such as a brushless DC motor, and in that way, it can estimate the motor speed. IC chip 10 combines back EMF sensor 16, voltage control oscillator (VCO) 20, and a sequencer to form a phase-locked loop which provides a speed sensorless control for motor 18. An advantage of the ML4425 chip is that it realizes a kind of sensorless control performance by use of back EMF estimation without discrete speed or position sensing elements.

Referring further to FIG. 2, in the illustrated configuration, another feedback is required, which is provided via resistor Rdc 22. Basically, an attempt is made to measure the DC current. The DC voltage is fixed, and an attempt is made to control the DC current within certain limits. The illustrated configuration limits the power output, which brings up the limitations of IC chip 10. For example, IC chip 10 can only limit the DC current, which means it can only limit the power. When an attempt is made to start motor 24, motor 24 is at a very low speed, and the power is very low, because the output voltage is very low and the power is the product of the AC voltage and current. However, since the rated motor power is relatively high, such as 30 kilowatts, it is necessary to fix the DC current limit to a relatively high value. A problem occurs if a high DC current limit is selected, AC current cannot be limited at low speed because the power is equal to the AC current multiplied by the AC voltage, and this power is also proportionate to the speed. At low speeds the power is very low, but the current can be very high. The problem here is that the AC current is very high, and it cannot be limited. Thus, quite often when an attempt is made to start motor 24, because the AC current is too high, it simply trips the circuit protection and prevents the successful starting of motor 24.

Referring again to FIG. 2, another problem in the illustrated configuration is that only power is regulated. When the power for the DC current is higher than the limit, it stops the PWM switching. Basically, the configuration attempts to regulate power. The configuration has only one of the two control modes. If current control is used, the speed regulation will not be available. In current control mode, it only limits the DC current. When the speed loop is used, the current loop must be disconnected, which is another limitation of IC chip 10. In addition, the DC current required by IC chips such as the ML4425 chip must be obtained through a serial resistor at a DC bus of the inverter, and it is difficult to provide isolation in high power inverter systems with a high DC bus voltage. There is a current need for an improved configuration that overcomes thee limitations of IC chip 10.

SUMMARY OF INVENTION

In one aspect, the present circuits and methods provide a speed sensorless controller for permanent magnet synchronous motors (PMSM).

In another aspect, the present circuits and methods provide an improved circuit configuration for PMSM control that utilizes added external current and speed regulators and replaces DC current feedback with AC current feedback. In another aspect, present circuits and methods provide new circuitries for PMSM control that are built surrounding a hybrid IC chip, such as the Micro Linear Controller ML4425 chip, that is, an unintelligent chip designed for brushless DC motor control.

In still another aspect, the present circuits and methods provide an improved circuit configuration for PMSM control that can easily fit into a new hybrid IC design because of the simplicity of the circuitry.

In yet another aspect, the present circuits and methods provide an improved circuit configuration for PMSM control that utilizes a two-loop controller, including a speed controller and a current controller, which overcomes limitations inherited from the IC chip and provides wide speed range applications.

In a further aspect, the present circuits and methods provide two control modes: current control mode and speed control mode. When the current control mode is used, regulated control signal is applied to the IC chip, unlike the configuration illustrated in FIG. 2 where a constant command is applied to the IC chip. When speed control mode is used, the current control serves as inner control loop.

In one illustrated embodiment, the present circuits and methods provide an improved circuit configuration that can be used with an IC chip having internal back EMF estimation to control a PMSM driven by AC current converted from DC current by an inverter. The circuit configuration includes, for example, two AC current sensors for detecting at least two AC phase currents of the PMSM, which are used as input to an AC current feedback circuit. The AC current feedback circuit includes, for example, an operational amplifier for generating a third AC phase current from the two AC phase currents, as well as a three-phase diode bridge for converting the three AC phase currents to a DC feedback current signal used as an input to a scaling circuit. The DC current feedback signal represents an AC PMSM motor phase current magnitude and is used as a current feedback in an inner current control loop. The AC current feedback circuit also utilizes a variable resistor such that when the two phase currents are set at a zero value, an output voltage level of the operational amplifier is zero to prevent any analog signal drifting or offset.

The scaling circuit, which is coupled to the AC current feedback circuit, scales the DC current feedback signal to a pre-defined voltage level which is used as input to the current limit of the IC chip and as a current feedback signal input to a current regulator. If the output of the scaling circuit connected to the current limit of the IC chip is higher than the set level of current limit of the IC chip, the IC chip will stop switching the IGBTs until the current feedback is below a pre-defined limit. The current regulator, which is coupled to the scaling circuit, controls the AC motor current using a current reference signal from a speed regulator and the current feedback signal from the scaling circuit. The current regulator includes a proportional-integral (PI) current regulator for generating a control signal as input to the IC chip. The speed regulator, which is coupled to the current regulator, generates a reference signal as input to the current regulator using a speed command and a back EMF signal obtained from a three phase AC PMSM voltage input to a back EMF sampler of the IC chip as a speed feedback. The speed regulator also includes a PI regulator which generates a reference signal to the current regulator using the speed command and the speed feedback.

Additional objects, advantages and novel features of the present circuits and methods will be set forth in part in the description which follows, and in part will become more apparent to those skilled in the art upon examination of the following, or may be learned by practice of the invention.

BRIEF DESCRIPTION OF DRAWINGS

In the drawings, identical reference numbers identify similar elements or acts. The sizes and relative positions of elements in the drawings are not necessarily drawn to scale. For example, the shapes of various elements and angles are not drawn to scale, and some of these elements are arbitrarily enlarged and positioned to improve drawing legibility. Further, the particular shapes of the elements as drawn, are not intended to convey any information regarding the actual shape of the particular elements, and have been solely selected for ease of recognition in the drawings.

DETAILED DESCRIPTION

In the following description, certain specific details are set forth in order to provide a through understanding of various embodiments of the invention. However, one skilled in the art will understand that the invention may be practiced without these details. In other instances, well-known structures associated with electrical circuits and circuit elements have not been shown or described in detail to avoid unnecessarily obscuring descriptions of the embodiments of the invention.

Unless the context requires otherwise, throughout the specification and claims which follow, the word "comprise" and variations thereof, such as, "comprises" and "comprising" are to be construed in an open, inclusive sense, that is as "including, but not limited to."

Figure 2:
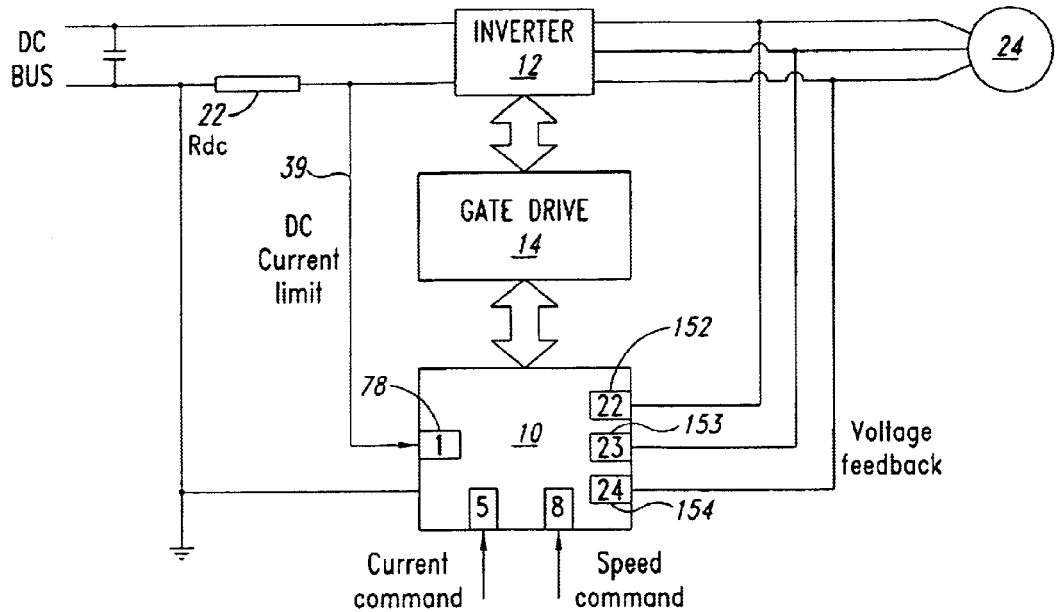
FIG. 2 is a block diagram which illustrates an example of a motor control system configuration utilizing the IC chip of FIGS. 1A and 1B.
Figure 3:
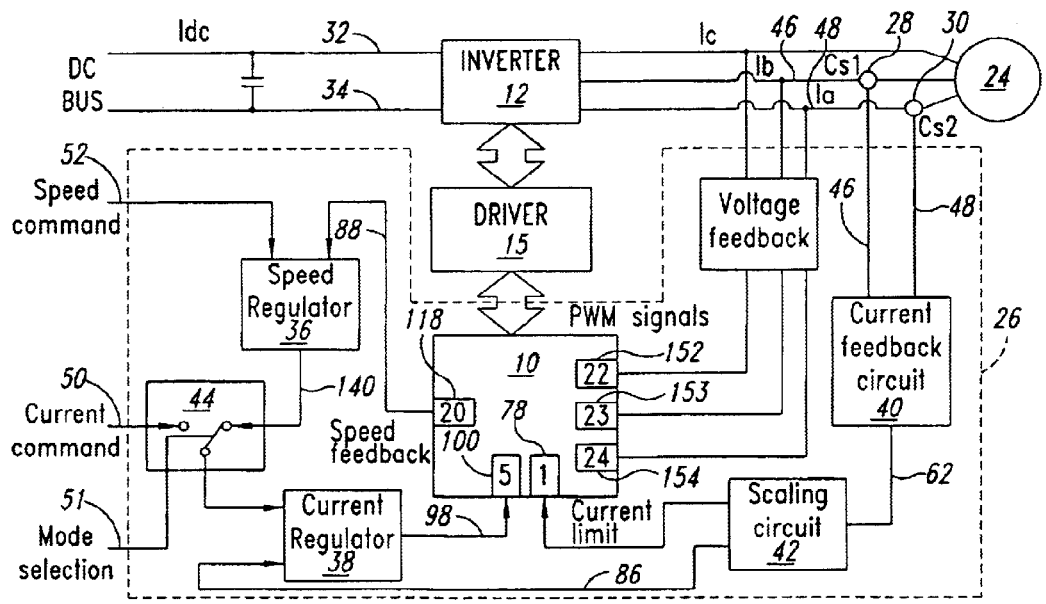
FIG. 3 is a block diagram which illustrates an embodiment of the present circuits and methods built around the IC chip of FIGS. 1A and 1B.

FIG. 3 is a block diagram which shows an example of the improved hardware configuration (hybrid circuit) 26 built around IC chip 10, such as the off-shelf ML4425 chip, for an illustrated embodiment of the present circuits and methods. Referring to FIG. 3, either speed control mode or current control mode can be used. Mode selection 51 is controlled by a user. Closing mode selection switch 44 to current command 50 enables operation in current control mode. In this mode, the AC output current is regulated according to the command current, unlike in the configuration illustrated in FIG. 2 in which there is no regulation. Closing mode selection switch 44 to the output of speed regulator 36, enables speed control mode operation. Circuit 26 provides novel features, such as a two-loop control system, including a speed loop with an inner current control loop, and AC current detection and control. Circuit 26 is shown within the broken lines and is used in inverter 12 and permanent magnet synchronous motor 24 drive control. Outside the broken lines are shown inverter 12, whose three phase outputs control motor 24, two AC current sensors, Cs1 28 and Cs2 30, logic control gate drive circuit 15, and DC voltage input lines 32, 34 to inverter 12. The function of inverter 12 is to convert DC power to three phase AC power to drive motor 24, and circuit 26 is used to control inverter 12 and motor 24.

Figure 1A:
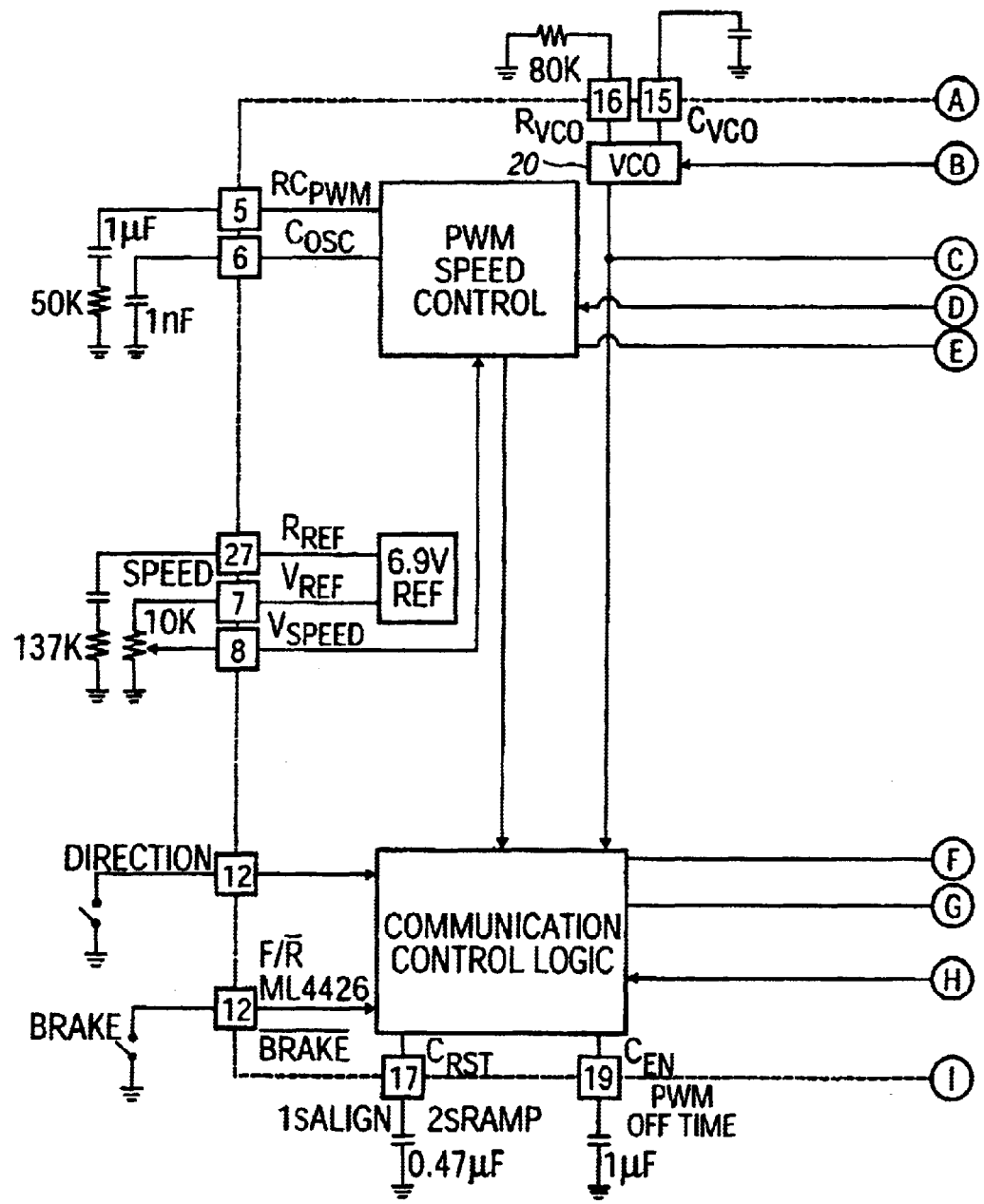
FIGS. 1A and 1B are a block diagram which illustrates a typical prior art application using an IC chip, such as the off-shelf ML4425 chip.
Figure 1B:
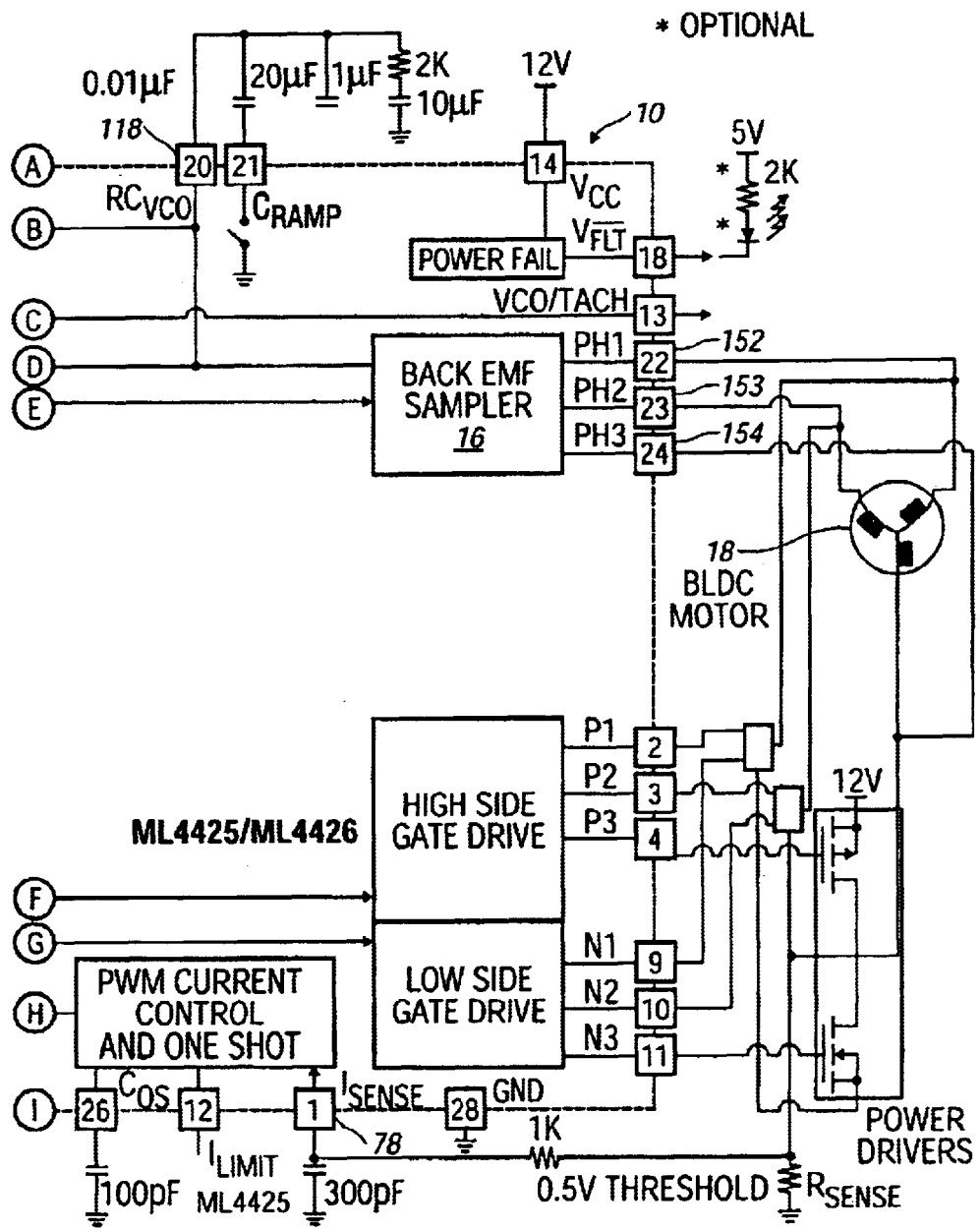

Circuit 26 utilizes IC chip 10, and includes additional components, such as speed regulator 36, current regulator 38, AC current feedback circuit 40, scaling circuit 42, and mode selection switch 44. In circuit 26, two AC phase currents, $i_b$ 46 and $i_a$ 48, of motor 24 are detected at Cs1 28 and Cs2 30 and used as current feedback 40 in the inner current control loop. Back EMF sensor 16 of IC chip 10, as shown in FIGS. 1A and 1B, is utilized for detecting motor speed and used as the speed feedback in the outer speed control loop. Circuit 26 can control the motor current, and consequently, the starting torque, and also provides speed control in the entire speed range.

Referring again to FIG. 2 for comparison, which shows the system configuration in which IC chip 10 is used for inverter-PM control, circuit 26 replaces DC current feedback 39 shown in FIG. 2 with AC current feedback 40, external current regulator 38, and external speed regulator 36, shown in FIG. 3. In the operation of circuit 26 at very low speed, such as near zero revolutions per minute (RPM), speed regulator 36 is in an open loop control mode due to the back EMF estimation limitation of IC chip 10, and only current regulator 38 is active. Current feedback signal 86, together with output signal 140 of speed regulator 36, serves as the input of current regulator 38. Current regulator 38 controls the AC motor current and drives the motor speed from standstill. This also limits any inrush current during starting of motor 24. Once the motor speed reaches a certain level, the back EMF from IC chip 10 is sufficient to estimate the motor speed. The estimated motor speed is compared with speed command 52, and the error of these two signals provides the input of speed regulator 36. The outer speed control loop, together with the inner current control loop, makes the control of motor 24 possible with all the requirements, such as torque, speed and power, being satisfied.

Figure 4:
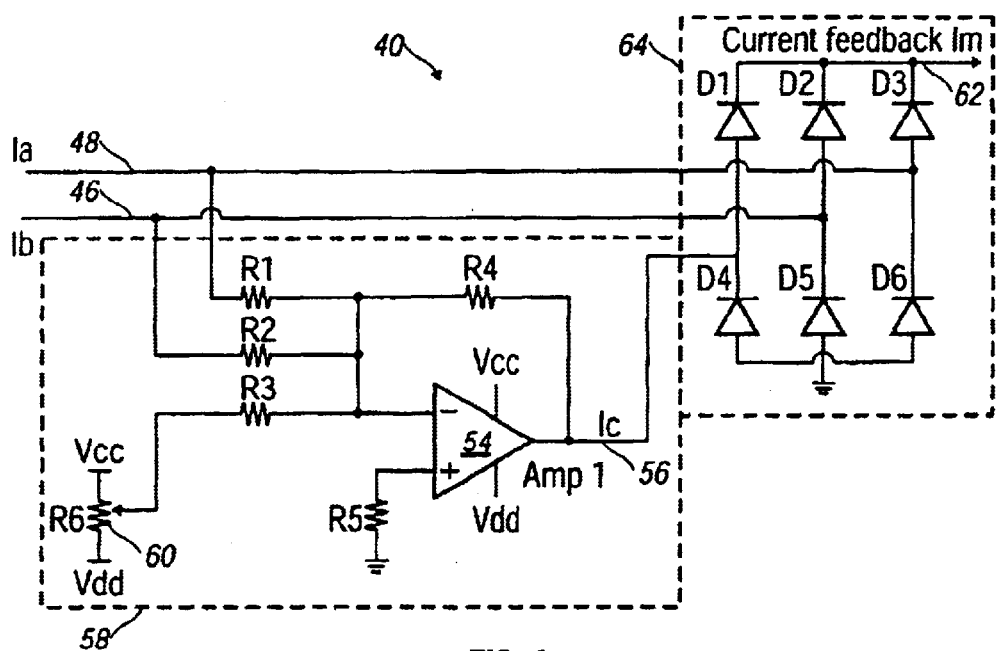
FIG. 4 is an electrical schematic diagram which provides further detail regarding the AC current feedback shown in FIG. 3 for an embodiment of the present circuits and methods.

FIG. 4 is an electrical schematic diagram which provides further detail regarding AC current feedback circuit 40 shown in FIG. 3. Referring to FIG. 4, AC phase currents $i_a$ 48 and $i_b$ 46 from motor 24 are used as inputs to AC current feedback circuit 40. Operational amplifier Amp 1 54 is used to generate third phase current $i_c$ 56. For a three-wire system, the following equation should be met: $i_a + i_b + i_c = 0$. Third phase current $i_c$ can be obtained by: $i_c = -(i_a + i_b)$. Operational amplifier Amp 1 54 and its surrounding circuit 58 in FIG. 4 are used to obtain third phase current $i_c$ 56 from phase currents $i_a$ 48 and $i_b$ 46 according to the above equation. To prevent any analog signal drifting or offset, variable resistor R6 60 is used such that when phase currents $i_a$ 48 and $i_b$ 46 are set at a zero value, the output voltage level of operational amplifier Amp 1 54 is zero. The three AC phase currents $i_a$ 48, $i_b$ 46, and $i_c$ 56 are then converted to a DC current feedback signal, $l_m$ 62, by using three-phase diode bridge D1-D6 64. The output of diode bridge 64, current feedback $l_m$ 62, represents the AC motor phase current magnitude and is fed to scaling circuit 42 as shown in FIG. 3.

Figure 5:
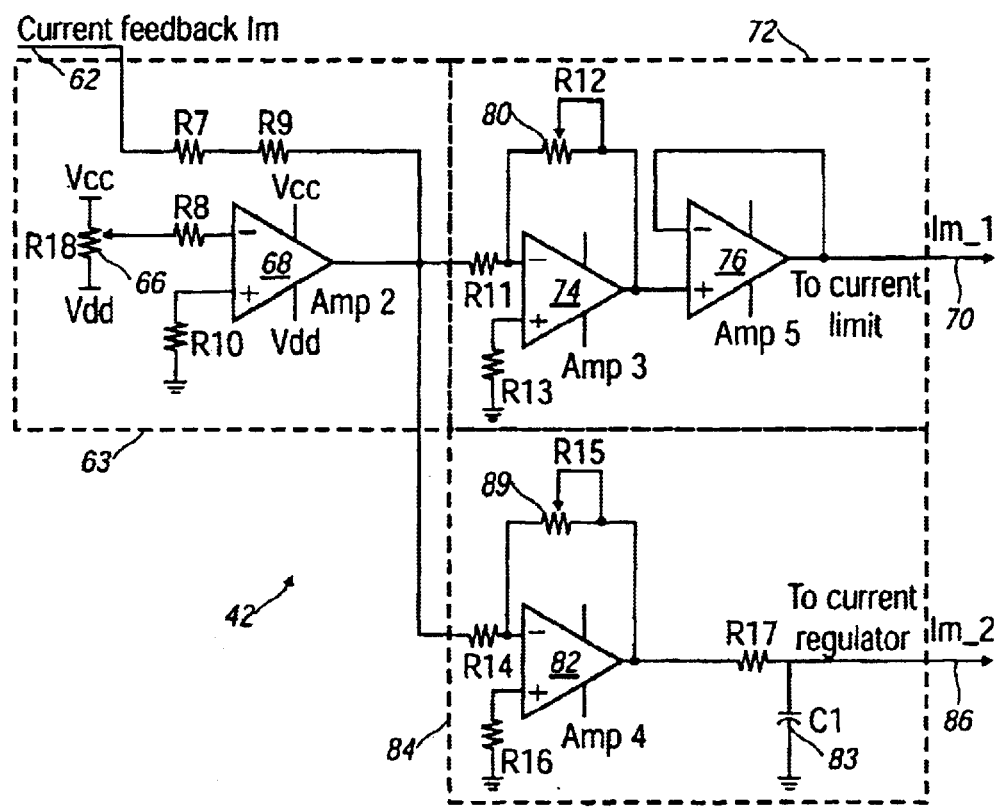
FIG. 5 is an electrical schematic diagram which provides greater detail regarding the current scaling circuit shown in FIG. 3 for an embodiment of the present circuits and methods.

FIG. 5 is an electrical schematic diagram which provides greater detail regarding scaling circuit 42 shown in FIG. 3. Referring to FIG. 5, current feedback $l_m$ 62 goes through buffer circuit 63, comprising resistors R7–R10, resistor R18 66 and amplifier Amp 2 68. Resistor R18 66 is used to compensate zero offsets and to eliminate the offsets coming from diode bridge D1-D6 64 as shown in FIG. 4. The output of scaling circuit 72—comprising resistors R11-R13, amplifier Amp 3 74 and amplifier Amp 5 76—current feedback $l_{m\_1}$ 70, is connected at Pin 1 78 to a current limit of IC chip 10. Referring further to FIG. 5, variable resistor R12 80 is used to set the gain of amplifier Amp 3 74. Similarly, resistors R14–R17, amplifier Amp 4 82 and capacitor C1 83 comprise scaling circuit 84 for current feedback signal $l_{m\_2}$ 86 used for current regulator 38. Variable resistor R15 89 is used to set the gain of amplifier Amp 4 82. Through the gain adjustment of amplifier Amp 4 82, the feedback current scale can be adjusted. The AC current limit function is realized by using the internal current limit of IC chip 10. Current feedback $l_{m\_1}$ 70 is connected at Pin 1 78 to the current control of IC chip 10, as shown in FIG. 3. When the value of current feedback $l_{m\_1}$ 70 is higher than the current limit, IC chip 10 will stop switching the IGBTs until current feedback $l_{m\_1}$ 70 is below the limit.

Scaling circuit 42 scales and converts the voltage for IC chip 10, which has certain limitations, such as the input voltage level must be within a certain range, which is known and specified for the particular IC chip 10. One output, that of scaling circuit 42—current feedback $l_{m\_1}$ 70—goes to the current limit of IC chip 10 at Pin 1 78, and the other output of scaling circuit 42, current feedback signal $l_{m\_2}$ 86, goes to current regulator 38. An error signal is generated, which goes to the current regulator 38. Current feedback $l_{m\_1}$ 70 goes to the current control at Pin 1 78 of IC chip 10, which is for over current limit. When a current limit is reached, IC chip 10 attempts to stop switching the IGBTs and to lower the current.

Figure 6:
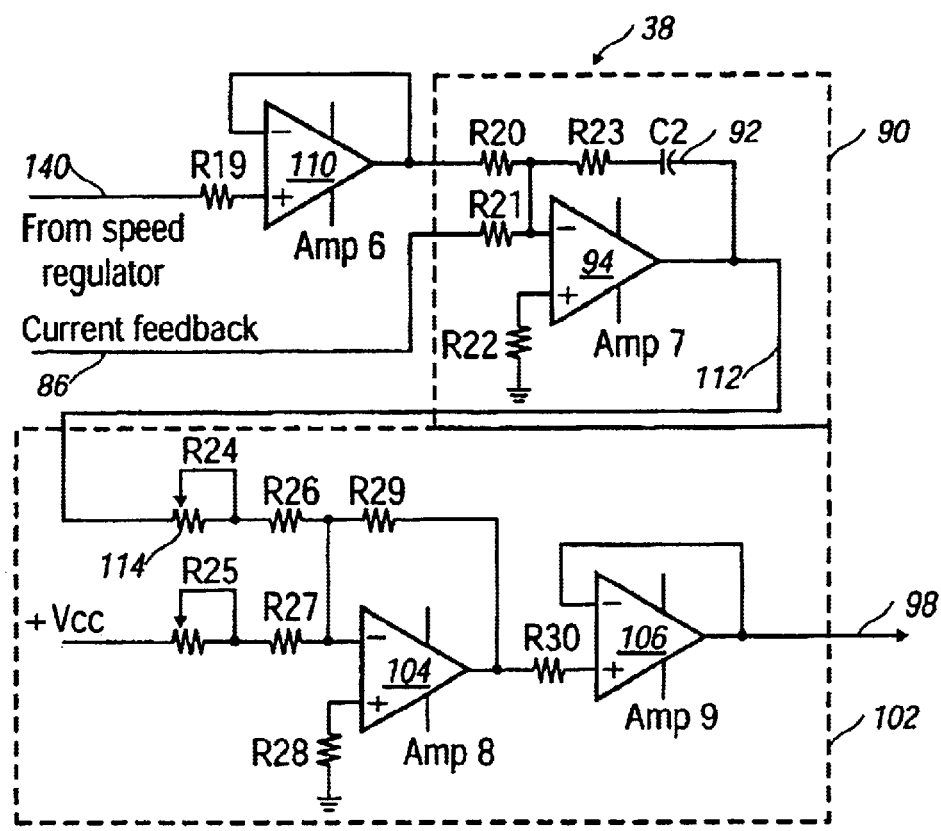
FIG. 6 is an electrical schematic diagram which provides further detail regarding the current regulator shown in FIG. 3 for an embodiment of the present circuits and methods.

FIG. 6 is an electrical schematic diagram which provides further detail regarding current regulator 38. Current regulator 38 and speed regulator 36 are used so that the AC current is under control and the speed sensorless control feature of IC chip 10 is fully utilized. A proportional-integral (PI) control for current regulation is adopted. PI regulator 90 comprises resistors R20–R23, capacitor C2 92, and amplifier Amp 7 94. The reference signal to current regulator 38 can be either output signal 140 of speed regulator 36, or an external reference signal, current command 50, through the control of mode selection switch 44, as shown in FIG. 3. Output 98 of current regulator 38 is fed to IC chip 10 at Pin 5 100 for PWM modulation. The output of PI regulator 90 is scaled by the rest of the circuit, scaling circuit 102, comprising resistors R24–R30, and amplifiers Amp 8 104 and Amp 9 106, so that the output voltage level will fit in the PWM modulation range required by IC chip 10. Current regulator 38 controls the actual motor current based on the information from speed command 52 and speed feedback 88. At the same time, since the torque component of the output current is controlled according to estimated EMF and zero crossing measurement by IC chip 10, a better utilization of current is obtained, and therefore, the DC current is also better utilized.

Referring further to FIG. 6, current regulator 38 includes PI regulator 90 and scaling circuit 102. Amplifier Amp 6 110 is a voltage follower, and there are two inputs to amplifier Amp 7 94, one of which is output signal 140 of speed regulator 36 or current command 50 (as depicted in FIG. 6, the input is output signal 140), and the other is current feedback signal 86. Output 112 of PI regulator 90 goes through two resistors R24 114 and R26, which scale output 112 of PI regulator 90. Current feedback 40 of circuit 26 is different from DC current feedback 39 of the configuration shown in FIG. 2, which makes use of a DC current. In circuit 26, current feedback 40 is AC current, which is an important aspect, because AC response to the control is critical. Thus, a key aspect of an embodiment of the present circuits and methods is that current feedback 40 is AC current rather than DC current, which tends to be slow and inaccurate. The purpose of scaling circuit 102 is to scale output 98 of current regulator 38 to a certain voltage level to meet a pre-defined voltage limitation of IC chip 10.

Figure 7:
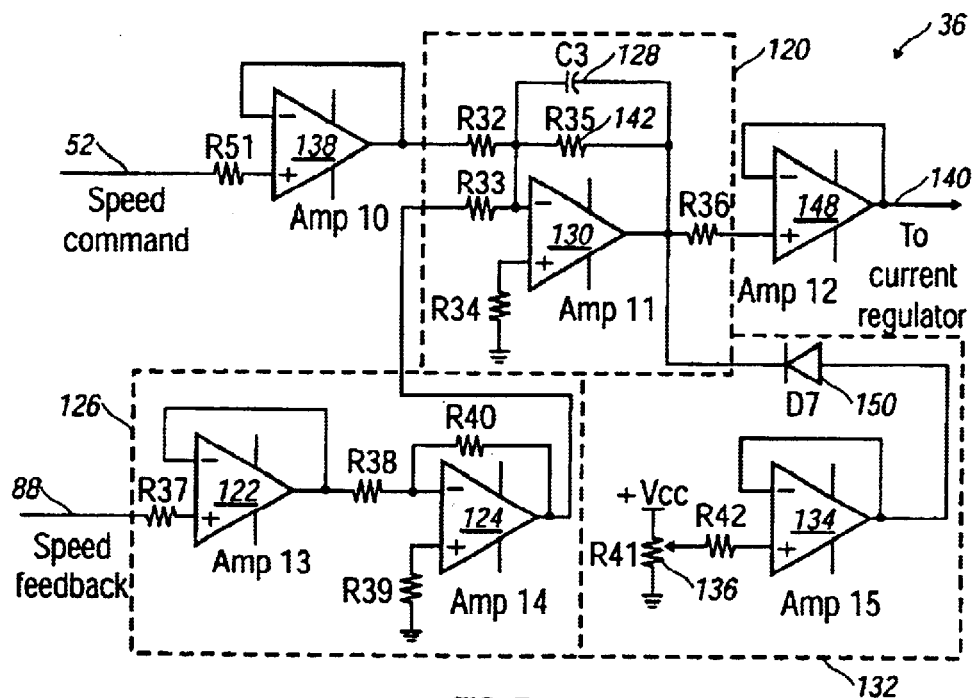
FIG. 7 is an electrical schematic diagram which provides further detail regarding the speed regulator shown in FIG. 3 for an embodiment of the present circuits and methods.

FIG. 7 is an electrical schematic diagram which provides further detail regarding speed regulator 36 shown in FIG. 3 that provides a speed control loop. Speed regulator 36 uses the back-EMF signal at Pin 20 118 from IC chip 10 as its speed feedback 88. At very low speed there is no back EMF built up, and speed feedback 88 at Pin 20 118 will be proportional to speed command 52. Once motor 24 is driven above a certain speed, estimated speed feedback 88 is available from the IC chip 10. Speed regulator 36 also comprises PI regulator 120 with an inner current control loop incorporated. Resistors R37–R40, and amplifiers Amp 13 122 and Amp 14 124 comprise buffer circuit 126 for speed feedback 88. PI regulator 120 comprises resistors R32–R36, capacitor C3 128 and amplifier Amp 11 130. The speed regulator output is limited by clamp circuit 132, comprising resistors R41 136, R42, diode D7 150, and amplifier Amp 15 134. The output voltage level is adjusted by variable resistor R41 136. The input to speed regulator 36, speed command 52, is a voltage signal, for example, from zero to five volts, which is selected by the user, depending on what speed is desired. Amplifier Amp 10 138 is a voltage follower, which is simply a buffer circuit for signal conditioning. A voltage follower is an analog circuit with very high input impedance and very low output impedance. The voltage follower increases the input impedance and decreases the output impedance.

PI regulator 120 has two input signals, one of which is speed command 52 and the other of which is speed feedback 88, which are scaled the same level with different signs. The difference of these two signals goes into amplifier Amp 11 130. For example, assume that speed command 52 is set to a certain level, speed feedback 88 is lower than speed command 52, and the error is a positive number rather than zero. Since it is a positive number, the proportional part of PI regulator 120 means that the error is multiplied by a constant and used as part of the output, and the integral part is that the error is integrated as another part of the output of PI regulator 120. The purpose of this is to improve dynamic and steady state speed response.

PI regulator 120 has one output, output signal 140, which represents two parts added together. Resistor R35 142 and capacitor C3 128 are used as PI regulator components, and the outputs are added together as the output that goes to amplifier Amp 12 148. In addition, clamp circuit 132 is provided that is a one direction clamp. The PI regulator output, output signal 140, can be positive or negative. Here, the output level can be selected. Amplifier Amp 15 134 functions as a voltage follower. The voltage level at the right hand side of diode D7 150 is about the same as at the left hand side. The difference is the diode forward voltage drop that can be 0.3 volts. If the voltage is higher on the right hand side of diode D7 150 than on the left hand side, the current will go from right to left. The PI regulator output, output signal 140, will be the same as the voltage divider at resistor R41 136 and depends on how high the output limit is set. Speed regulator 36 has one output, output signal 140, that goes to current regulator 38.

Referring again to FIG. 3, speed feedback 88 at Pin 20 118 from IC chip 10 is a voltage signal which is proportional to speed and is the feedback signal. IC chip 10 measures a three-phase AC voltage signal, and estimates the back EMF, and generates the voltage signal that is proportional to the speed.

The present circuits and methods enable the creation of a new hybrid circuit that employs an off-shelf device such as ML4425. The present circuits and methods can be operated either in current or speed control mode and can be configured as a two loop control system with a current regulator as an inner loop and a speed loop as an outer loop. Two-loop control systems are widely used in a variety of industrial applications. The AC current control of one embodiment of the present circuits and methods can limit AC over current and protect AC motors and inverter devices.

All of the above U.S. patents, U.S. patent application publications, U.S. patent applications, foreign patents, foreign patent applications and non-patent publications referred to in this specification and/or listed in the Application Data Sheet, including, but not limited to U.S. Ser. No. 60/319,068 filed Jan. 16, 2002, are incorporated herein by reference, in their entirety.

From the foregoing it will be appreciated that, although specific embodiments of the invention have been described herein for purposes of illustration, various modifications may be made without deviating from the spirit and scope of the invention. Accordingly, the invention is not limited except as by the appended claims.

What is claimed is:

1. A circuit for controlling a permanent magnet synchronous motor, comprising:
    at least one sensor for detecting at least two AC phase currents of the motor;
    an AC current feedback circuit, configured to generate a third AC phase current from the at least two AC phase currents and to convert the at least two AC phase currents and the third AC phase current to a DC current feedback signal;
    a scaling circuit, configured to scale the DC current feedback signal;
    an integrated circuit chip, configured to receive the scaled DC current feedback signal from the scaling circuit; and,
    a current regulator, configured to receive the scaled DC current feedback signal from the scaling circuit and to control the motor based on the scaled DC current feedback signal.

2. The circuit of claim 1, wherein the current regulator is configured to control the motor based on a current command in addition to the scaled DC current feedback signal.

3. The circuit of claim 1, wherein the at least one sensor comprises two AC current sensors configured to detect two AC phase currents used as inputs to the AC current feedback circuit.

4. The circuit of claim 1, wherein the at least one current sensor comprises two AC current sensors configured to detect two AC phase currents used as a current feedback in an inner current control loop.

5. The circuit of claim 1, wherein the AC current feedback circuit comprises an operational amplifier configured to generate the third AC phase current.

6. The circuit of claim 5, wherein the AC current feedback circuit further comprises a variable resistor coupled to the operational amplifier, wherein the variable resistor is configured to set an output voltage level of the operational amplifier at zero when the at least two AC phase currents have a zero value.

7. The circuit of claim 1, wherein the AC current feedback circuit comprises a three-phase diode bridge configured to convert the at least two AC phase currents and the third AC phase current to the DC current feedback signal.

8. The circuit of claim 1, wherein the scaling circuit comprises a buffer circuit, a second scaling circuit and a third scaling circuit.

9. The circuit of claim 8, wherein the buffer circuit comprises an operational amplifier and a resistor, wherein the resistor is configured to compensate zero offsets from the AC current feedback circuit.

10. The circuit of claim 8, wherein the second scaling circuit is configured to provide the scaled DC current feedback signal to a current limit of the chip.

11. The circuit of claim 10, wherein the chip further comprises at least one IGBT and is configured to stop switching the at least one IGBT when the scaled DC current feedback signal is greater than the current limit.

12. The circuit of claim 11, wherein the chip is further configured to resume switching the at least one IGBT when the scaled DC current feedback signal is less than or equal to the current limit.

13. The circuit of claim 10, wherein the second scaling circuit comprises at least two operational amplifiers and a variable resistor, wherein the variable resistor is configured to set a gain of one of the at least two operational amplifiers.

14. The circuit of claim 8, wherein the third scaling circuit is configured to provide the scaled DC current feedback signal to the current regulator.

15. The circuit of claim 14, wherein the third scaling circuit comprises a variable resistor and an operational amplifier, and wherein the variable resistor is configured to set a gain of the operational amplifier.

16. The circuit of claim 1, wherein the current regulator comprises a proportional-integral regulator and a fourth scaling circuit.

17. The circuit of claim 16, wherein the fourth scaling circuit is configured to scale an output of the current regulator and to provide the scaled output to the chip.

18. The circuit of claim 1, further comprising:
a speed regulator;
wherein:
the chip further comprises a back EMF sampler configured to generate a speed feedback;
the speed regulator is configured to receive the speed feedback and to generate a reference signal based on a speed command and the speed feedback; and,
the current regulator is configured to be able to receive the reference signal from the speed regulator, and to control the motor using the reference signal in addition to the scaled DC current feedback signal.

19. The circuit of claim 18, wherein the current regulator is permanently configured to receive the reference signal from the speed regulator.

20. The circuit of claim 19, wherein the current regulator is configured to always control the motor using the reference signal in addition to the scaled DC current feedback signal.

21. The circuit of claim 18, wherein the current regulator is selectively configured to receive the reference signal from the speed regulator.

22. The circuit of claim 21, further comprising:
a switch, coupled to the current regulator and configured to receive the reference signal from the speed regulator when in a first position and a current command when in a second position;
wherein the current regulator is configured to control the motor based on:
(a) the reference signal and the scaled DC current feedback signal when the switch is in the first position; and,
(b) the current command and the scaled DC current feedback signal when the switch is in the second position.

23. The circuit of claim 22, wherein the current regulator comprises a proportional-integral regulator and the proportional-integral regulator comprises an operational amplifier configured to receive:
the scaled DC current feedback signal from the scaling circuit and the reference signal when the switch is in the first position; and
the current command and the scaled DC current feedback signal when the switch is in the second position.

24. The circuit of claim 18, wherein the speed regulator comprises a proportional-integral regulator, a buffer circuit and a clamp circuit.

25. The circuit of claim 24, wherein the proportional-integral regulator is configured to generate the reference signal based on the speed feedback and the speed command.

26. The circuit of claim 25, wherein the proportional-integral regulator comprises an operational amplifier and is configured to scale the speed feedback and the speed command to the same level with different signs and to provide a difference between the scaled speed feedback and the scaled speed command to the operational amplifier.

27. The circuit of claim 24, wherein the clamp circuit comprises a variable resistor, a diode and an operational amplifier.

28. A method of controlling a permanent magnet synchronous motor, comprising:
detecting at least two AC phase currents of the motor;
using an AC current feedback circuit to generate a third AC phase current from the at least two AC phase currents and to convert the at least two AC phase currents and the third AC phase current to a DC current feedback signal;
scaling the DC current feedback signal;
providing the scaled DC current feedback signal to an integrated circuit chip; and,
using a current regulator to control the motor based on the scaled DC current feedback signal.

29. The method of claim 28, wherein using a current regulator to control the motor based on the scaled DC current feedback signal comprises controlling the motor based on a current command in addition to the scaled DC current feedback signal.

30. The method of claim 28, wherein the at least two AC phase currents comprise two AC phase currents used as inputs to the AC current feedback circuit.

31. The method of claim 28, wherein the at least two AC phase currents comprise two AC phase currents used as a current feedback in an inner current control loop.

32. The method of claim 28, wherein the AC current feedback circuit comprises an operational amplifier and wherein the third AC phase current is generated using the operational amplifier.

33. The method of claim 32, wherein the AC current feedback circuit further comprises a variable resistor coupled to the operational amplifier and wherein the method further comprises using the variable resistor to set an output voltage level of the operational amplifier at zero when the at least two AC phase currents have a zero value.

34. The method of claim 28, wherein the AC current feedback circuit comprises a three-phase diode bridge and wherein the at least two AC phase currents and the third AC phase current are converted to the DC current feedback signal using the diode bridge.

35. The method of claim 28, wherein the scaling circuit comprises a buffer circuit, a second scaling circuit and a third scaling circuit.

36. The method of claim 35, wherein the buffer circuit comprises an operational amplifier and a resistor, wherein the method further comprises using the resistor to compensate zero offsets and to eliminate offsets from the AC current feedback circuit.

37. The method of claim 35, wherein providing the scaled DC current feedback signal to an integrated circuit chip comprises using the second scaling circuit to provide the scaled DC current feedback signal to a current limit of the chip.

38. The method of claim 37, wherein the chip further comprises at least one IGBT and wherein the method further comprises ceasing switching of the at least one IGBT when the scaled DC current feedback signal is greater than the current limit.

39. The method of claim 38, wherein the method further comprises resuming switching of the at least one IGBT when the scaled DC current feedback signal is less than or equal to the current limit.

40. The method of claim 37, wherein the second scaling circuit comprises at least two operational amplifiers and a variable resistor, wherein the method further comprises setting a gain of one of the at least two operational amplifiers using the variable resistor.

41. The method of claim 35, wherein the scaled DC current feedback signal is provided to the current regulator by the third scaling circuit.

42. The method of claim 41, wherein the third scaling circuit comprises a variable resistor and an operational amplifier, and wherein the method further comprises setting a gain of the operational amplifier using the variable resistor.

43. The method of claim 28, wherein the current regulator comprises a proportional-integral regulator and a fourth scaling circuit.

44. The method of claim 43, wherein the method further comprises using the fourth scaling circuit to scale an output of the current regulator and to provide the scaled output to the chip.

45. The method of claim 28, wherein the chip further comprises a back EMF sampler and the method further comprises:

detecting a back EMF signal using the back EMF sampler;

generating a speed feedback based on the back EMF signal;

generating a reference signal based on a speed command and the speed feedback;

controlling the motor based on the scaled DC current feedback signal and an additional signal selected from the reference signal and a current command.

46. The method of claim 45, wherein the motor is always controlled based on the scaled DC current feedback signal and the reference signal.

47. The method of claim 45, wherein the motor is selectively controlled based on the scaled DC current feedback signal and the additional signal selected from the reference signal and the current command.

48. The method of claim 47, further comprising adjusting a switch to select the additional signal.

49. The method of claim 45, wherein generating a reference signal based on a speed command and the speed feedback comprises using a proportional-integral regulator to generate the reference signal based on the speed feedback and the speed command.

50. The method of claim 49, wherein the proportional-integral regulator comprises an operational amplifier, and wherein the method further comprises using the proportional-integral regulator to scale the speed feedback and the speed command to the same level with different signs and providing a difference between the scaled speed feedback and the scaled speed command to the operational amplifier.

51. The method of claim 45, wherein the method further comprises limiting the reference signal using a clamp circuit.

52. The method of claim 51, wherein the clamp circuit comprises a variable resistor, a diode and an operational amplifier.

53. The method of claim 45, wherein the method further comprises providing the speed feedback to a buffer circuit prior to generating the reference signal based on the speed command and the speed feedback.

* * * * *